US011159566B2

(12) United States Patent
Lee et al.

(10) Patent No.: US 11,159,566 B2
(45) Date of Patent: Oct. 26, 2021

(54) COUNTERING PHISHING ATTACKS

(71) Applicant: INTERNATIONAL BUSINESS MACHINES CORPORATION, Armonk, NY (US)

(72) Inventors: Cheng-Ta Lee, Taipei (TW); Russell Couturier, Worcester, MA (US); Andrii Iesiev, Northampton, MA (US); Iosif Onut, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 486 days.

(21) Appl. No.: 16/106,337

(22) Filed: Aug. 21, 2018

(65) Prior Publication Data

US 2020/0067977 A1 Feb. 27, 2020

(51) Int. Cl.
*H04L 29/06* (2006.01)
*H04L 9/08* (2006.01)
*G06F 16/903* (2019.01)

(52) U.S. Cl.
CPC ........ *H04L 63/1483* (2013.01); *H04L 9/0825* (2013.01); *H04L 63/1491* (2013.01); *G06F 16/903* (2019.01)

(58) Field of Classification Search
CPC ............. H04L 63/1483; H04L 63/1491; H04L 9/0825; H04L 9/0866; H04L 9/0869; H04L 9/3247; G06F 16/903
See application file for complete search history.

(56) References Cited

U.S. PATENT DOCUMENTS 8,640,231 B2   1/2014  Florencio et al.
8,880,453 B2  11/2014  Catlett et al.
(Continued)

FOREIGN PATENT DOCUMENTS

CN   1321507 C   6/2007

OTHER PUBLICATIONS

Chandrasekaran, et al., "PHONEY: Mimicking User Response to Detect Phishing Attacks", Proceedings of 2006 International Symposium on a World of Wireless, Mobile and Multimedia Networks (WoWMoM 2006), Jun. 26-29, 2006, pp. 672-676, Institute of Electrical and Electronics Engineers, Buffalo, New York, USA.
(Continued)

*Primary Examiner* — Trang T Doan
(74) *Attorney, Agent, or Firm* — Daniel J. Swirsky; AlphaPatent Associates Ltd.

(57) ABSTRACT

Countering phishing attacks by generating multiple synthetic victims, where each of the synthetic victims includes synthetic victim information that represents a computer user identity and includes associated sensitive information, where the computer user identity and its associated sensitive information are fictitious in that they are not known to be associated with a legitimate computer user, providing any of the synthetic victim information of the synthetic victims to a computer-hosted phishing site, storing the synthetic victim information in a computer-accessible database, receiving from a computer-hosted target site information provided to the computer-hosted target site by a requestor, identifying in the computer-accessible database database synthetic victim information matching the requestor information, and notifying the computer-hosted target site that the requestor information is of a synthetic victim.

15 Claims, 4 Drawing Sheets

(56) References Cited

U.S. PATENT DOCUMENTS

| | | | |
|---|---|---|---|
| 2006/0059363 A1* | 3/2006 | Mese | G06F 21/31 |
| | | | 713/185 |
| 2007/0294762 A1 | 12/2007 | Shraim et al. | |
| 2007/0299777 A1 | 12/2007 | Shraim et al. | |
| 2009/0077637 A1 | 3/2009 | Santos et al. | |
| 2016/0308888 A1 | 10/2016 | Vargas Gonzalez | |
| 2017/0195346 A1* | 7/2017 | Be'ery | H04L 63/083 |
| 2018/0262503 A1* | 9/2018 | Dawson | G06F 21/46 |
| 2018/0367309 A1* | 12/2018 | Reinhold | H04L 9/004 |

OTHER PUBLICATIONS

Husak, et al., "PhiGARo: Automatic Phishing Detection and Incident Response Framework", Proceedings of 2014 Ninth International Conference on Availability, Reliability and Security, Sep. 8-12, 2014, pp. 295-302, Institute of Electrical and Electronics Engineers Computer Society Press Fribourg, Switzerland.

Li, et al, "A Novel Anti-Phishing Framework Based on Honeypots", Proceedings of 2009 eCrime Researchers Summit, Sep. 20-Oct. 21, 2009, pp. 1-13, Anti-Phishing Working Group, Inc., Tacoma, WA, USA.

Markmonitor (Author Unknown), "Rock Phishing: The Threat and Recommended Countermeasures", http://markmonitor.com/download/wp/wp-rockphish.pdf, May 9, 2008, MarkMonitor, Inc., San Francisco, CA, USA.

Pouget, et al., "Honeypot, Honeynet, Honeytoken: Terminological Issues", Research Report RR-03-081, http://www.eurecom.fr/en/publication/1275/download/ce-pougfa-030914b.pdf, Sep. 14, 2003, Institut Eurécom, Sophia Antipolis, France.

Sirisha, et al, "Sentry: Transforming Phishing Detection Into Automatic Fraud Protection", International Journal of Information Technology and Knowledge Management, Jul.-Dec. 2011, pp. 545-547, vol. 4, No. 2, Computer Science & Electronics Journals, Kurukshetra, Haryana, India.

Spitzner, "Honeytokens: The Other Honeypot" Jul. 17, 2003, Symantec Corporation, Mountain View, CA, USA.

Yu, et al., "BogusBiter: A Transparent Protection Against Phishing Attacks", ACM Transactions on Internet Technology, May 2010, vol. 10, No. 2, Article 6, ACM Inc., New York, NY, USA.

* cited by examiner

COUNTERING PHISHING ATTACKS

BACKGROUND

Phishing refers to attempting to fraudulently obtain sensitive information such as user names, passwords, and credit card information. Phishing typically involves designing communications media such as emails and web sites to appear as being associated with trustworthy entities, and thereby trick victims into providing sensitive information when they encounter such media. Designers of phishing attacks gather such sensitive information for later malicious use, and often sell such information to other malicious actors.

SUMMARY

In one aspect of the invention a method is provided for countering phishing attacks by generating multiple synthetic victims, where each of the synthetic victims includes synthetic victim information that represents a computer user identity and includes associated sensitive information, where the computer user identity and its associated sensitive information are fictitious in that they are not known to be associated with a legitimate computer user, providing any of the synthetic victim information of the synthetic victims to a computer-hosted phishing site, storing the synthetic victim information in a computer-accessible database, receiving from a computer-hosted target site information provided to the computer-hosted target site by a requestor, identifying in the computer-accessible database database synthetic victim information matching the requestor information, and notifying the computer-hosted target site that the requestor information is of a synthetic victim In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1:
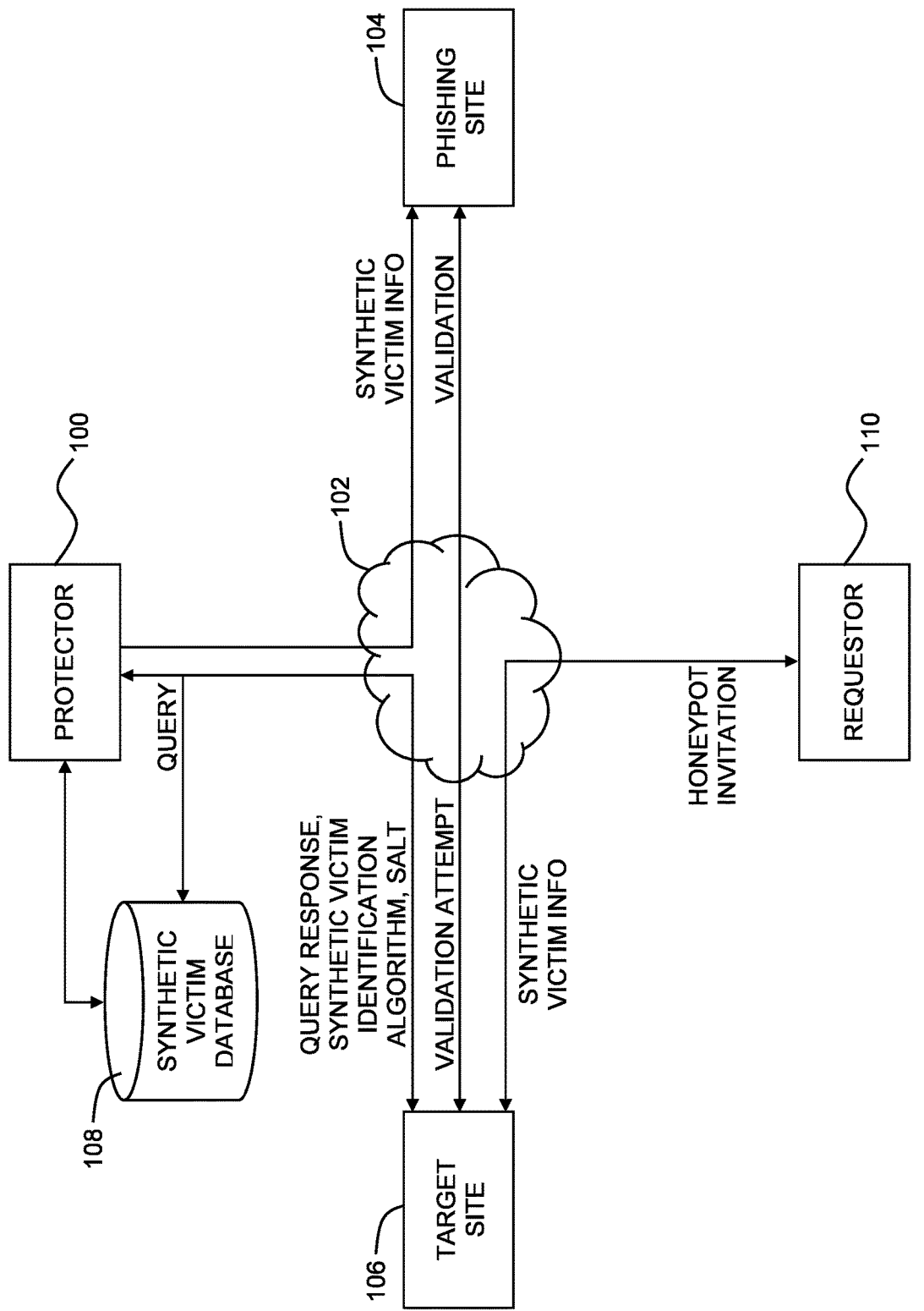
FIG. 1 is a simplified conceptual illustration of a system for countering phishing attacks, constructed and operative in accordance with an embodiment of the invention.

Reference is now made to FIG. 1, which is a simplified conceptual illustration of a system for countering phishing attacks, constructed and operative in accordance with an embodiment of the invention. In the system of FIG. 1, a computer, referred to herein as protector 100, is configured to communicate via a computer network 102, such as the Internet, with one or more phishing sites and target sites in the manner described hereinbelow, such as with a phishing site 104 and a target site 106. Phishing site 104 is identified, in accordance with conventional techniques, as a computer-hosted web site that performs "phishing," which are attempts to fraudulently obtain sensitive information, such as valid user name and password credentials of legitimate computer users of target site 106, which may, for example, be a banking web site. Identification of such phishing sites is performed by protector 100 and/or is performed by other parties that make the identities of such phishing sites publicly available or otherwise available to protector 100.

Protector 100 is configured to maintain a database 108 of synthetic victims, where a synthetic victim includes information that represents a computer user identity, and includes associated sensitive information, such as, but not limited to, user name and password credentials, credit card information, and Social Security number, but where the computer user identity and its associated sensitive information are fictitious in that they are not known to be associated with a legitimate computer user. Database 108 preferably includes a large number, such as millions or tens of millions or more, of synthetic victims and associated sensitive information, any or all of which protector 100 provides to phishing site 104, preferably in a manner appearing to phishing site 104 as that of an ordinary victim of phishing site 104. In one embodiment, any of the synthetic victims and their associated sensitive information in database 108 are generated by protector 100. Additionally or alternatively, any of the synthetic victims and their associated sensitive information are generated and maintained by target site 106, a copy of which is provided by target site 106 to protector 100 for storage in database 108.

In one embodiment, upon receiving information from a requestor 110 in association with target site 106, such as where a user name and a password are received as part of a login request to access target site 106, target site 106 determines that the requestor information is not associated with a legitimate user known as such to target site 106. Target site 106 then communicates the requestor information to protector 100, which searches database 108 for a synthetic victim whose information matches the requestor information. If a match is identified, protector 100 notifies target site 106 that the requestor information is that of a synthetic victim.

In one embodiment, protector 100 generates a synthetic victim user name using any known technique and then uses a predefined algorithm to derive an associated password using the user name and a predefined salt, optionally encoding additional information into the password, such as the network address of phishing site 104, and optionally signing the password, such as with an asymmetric private key belonging to protector 100 and that is paired with an asymmetric public key also belonging to protector 100. Protector 100 provides the predefined algorithm and salt to target site 106. Upon receiving the user name and password from requestor 110 during a login attempt, target site 106 validates the signature in accordance with conventional techniques, such as using the asymmetric public key belonging to protector 100, and uses the predefined algorithm and salt to determine whether the password was derived from the user name, as well as extract the aforementioned additional information that may have been encoded into the password. If target site 106 determines that the password was derived from the user name using the predefined algorithm and salt, this indicates that the user name and password are those of a synthetic victim.

In one embodiment, where target site 106 receives a user name and password during a login attempt by requestor 110, and the user name and password belong to a synthetic victim that was generated and maintained by target site 106 as described hereinabove, target site 106 is able to independently determine that the user name and password are those of a synthetic victim.

Once it becomes known to target site 106 that it has received credentials or other sensitive information associated with a synthetic victim, target site 106 preferably considers requestor 110 to be an attacker who either acquired the synthetic victim information directly or indirectly from phishing site 104, or where requestor 110 is in fact phishing site 104. In various embodiments target site 106 communicates the received synthetic victim information and/or the network address of requestor 110 to protector 100, which protector 100 preferably stores in database 108 in association with the matching synthetic victim, preferably together with a timestamp of the attack attempt, any of which information protector 100 preferably makes available to parties for security purposes. In various embodiments target site 106 takes one or more predefined security actions. In one such security action, target site 106 prevents requestor 110 from interacting further with target site 106. In another such security action, target site 106 directs requestor 110 to a "honeypot," which may be a facsimile of target site 106 with which requestor 110 is allowed to interact, such as for the purpose of learning the behavior of requestor 110 and gathering other information regarding requestor 110.

Any of the elements shown in FIG. 1 are preferably implemented by one or more computers in computer hardware and/or in computer software embodied in a non-transitory, computer-readable medium in accordance with conventional techniques.

Figure 2:
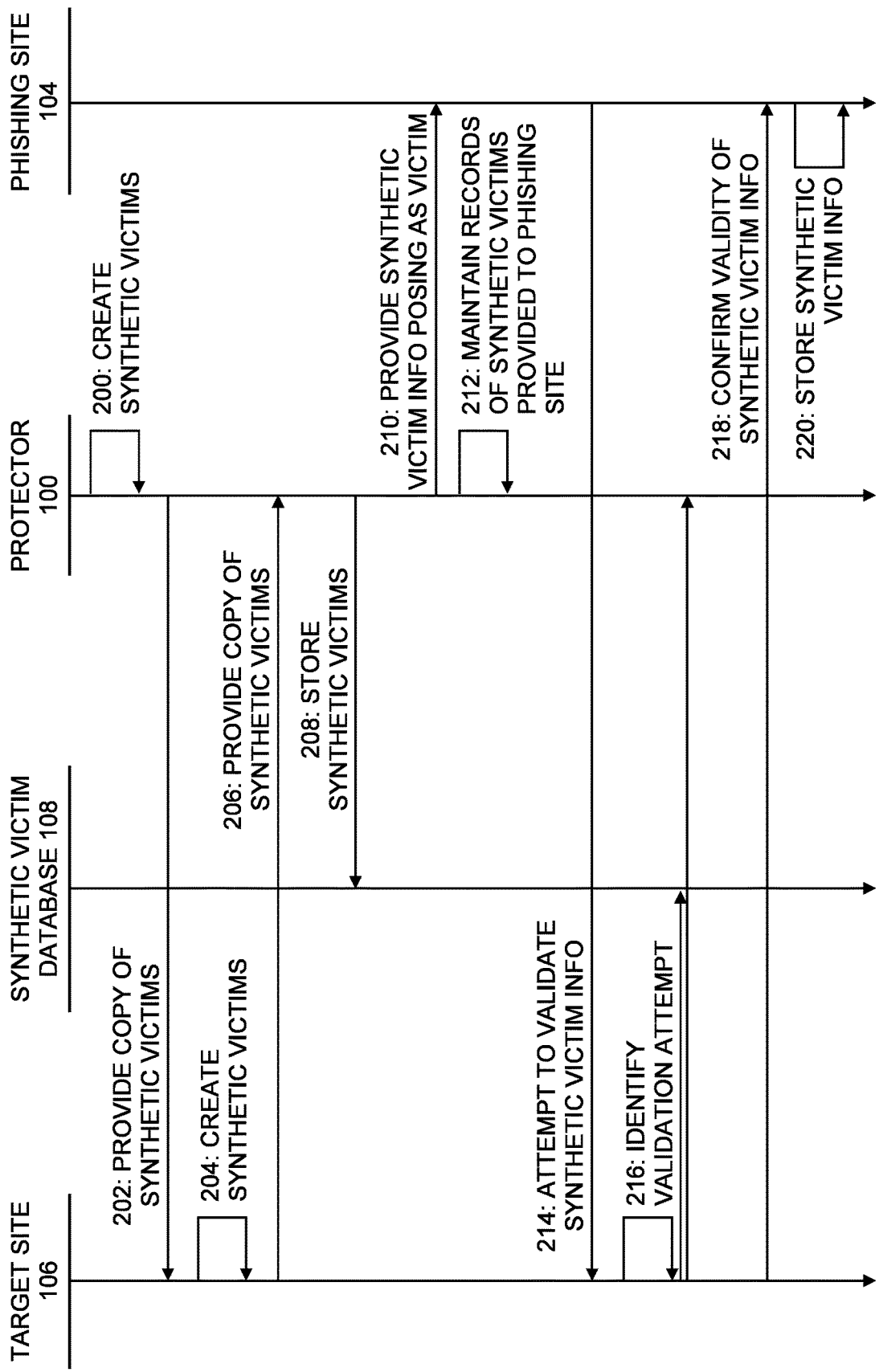
FIG. 2 is a simplified action diagram of an exemplary method of operation of the system of FIG. 1 for seeding phishing sites with synthetic victims, operative in accordance with an embodiment of the invention.

Additional reference is now made to FIG. 2, which is a simplified action diagram of an exemplary method of operation of the system of FIG. 1 for seeding phishing sites with synthetic victims, operative in accordance with an embodiment of the invention. In the method of FIG. 2, synthetic victims and their associated sensitive information are created by protector 100 (step 200) and optionally provided to target site 106 (step 202), and/or are created by target site 106 (step 204) and then provided by target site 106 to protector 100 (step 206), and are stored by protector 100 in database 108 (step 208). Protector 100 seeds phishing site 104 with sensitive information associated with a synthetic victim, such as with a user name and a password, by providing the sensitive information to phishing site 104 (step 210), preferably storing records in database 108 identifying the synthetic victims whose sensitive information protector 100 provides to phishing site 104, the IP address and/or domain name of phishing site 104, and a count of the number of synthetic victims whose sensitive information protector 100 provides to phishing site 104 (step 212). Should phishing site 104 attempt to validate the synthetic victim information by providing the synthetic victim information to target site 106 (step 214), target site 106 determines that the information received from phishing site 104 is that of a synthetic victim using any of the techniques described herein (step 216), i.e., independently or by querying database 108 or protector 100 with any information provided by phishing site 104, including its IP address or domain name, and, preferably if this is the first time that target site 106 receives the information for this synthetic victim, responds to phishing site 104 by indicating to phishing site 104 that the information received from phishing site 104 is valid (step 218), such as by providing a landing page indicating a successful login. Phishing site 104 stores the synthetic victim information for later use (step 220). Protector 100 preferably provides sensitive information of multiple synthetic victims to phishing site 104 in accordance with the method of FIG. 2, such as of a predefined number of synthetic victims and/or in accordance with a predefined schedule.

Figure 3:
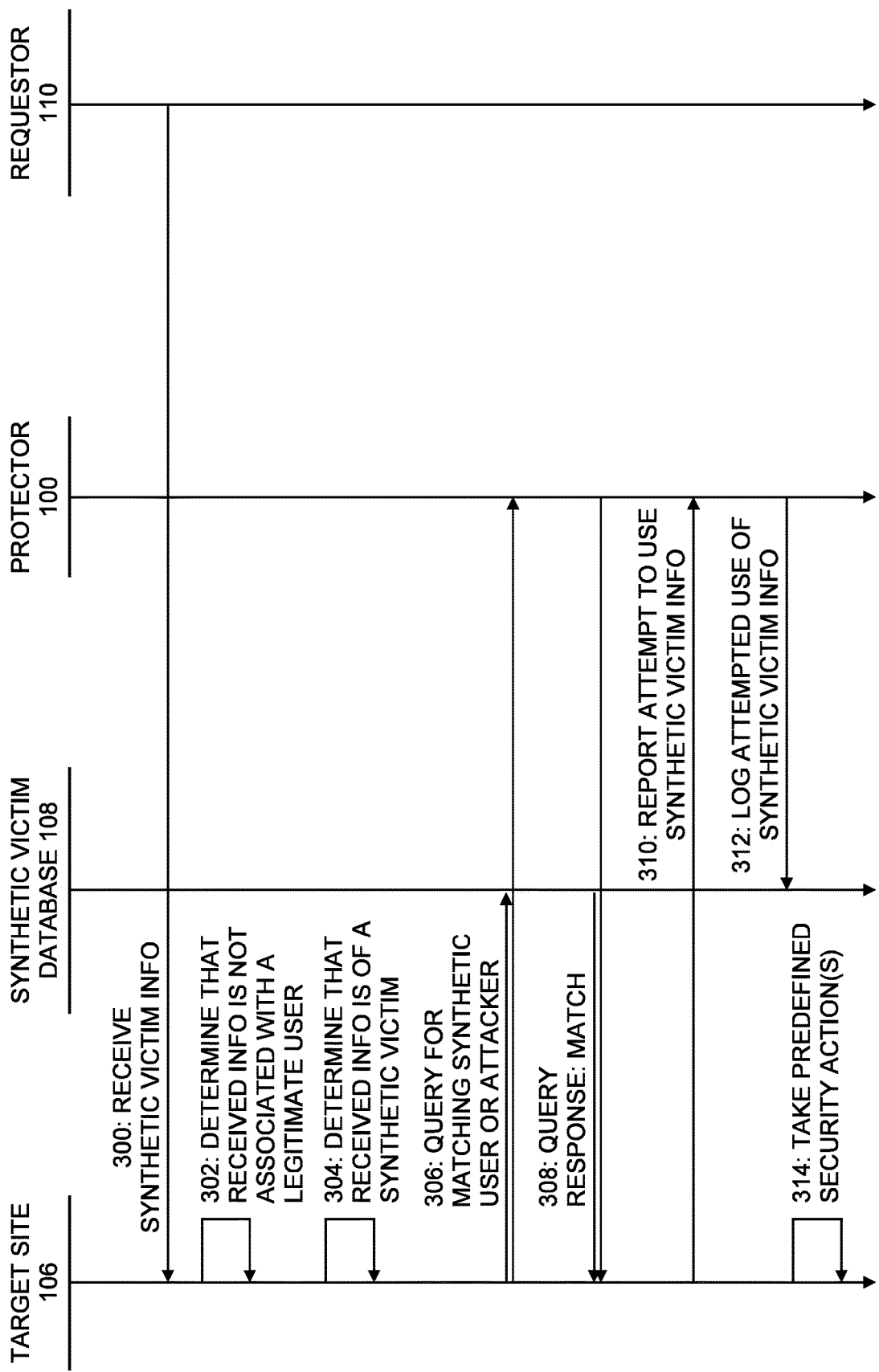
FIG. 3 is a simplified action diagram of an exemplary method of operation of the system of FIG. 1 for detecting use of synthetic victim information, operative in accordance with an embodiment of the invention.

Additional reference is now made to FIG. 3, which is a simplified action diagram of an exemplary method of operation of the system of FIG. 1 for detecting use of synthetic victim information, operative in accordance with an embodiment of the invention. In the method of FIG. 3, target site 106 receives synthetic victim information from requestor 110 (step 300), such as a user name and password as part of a login request, which information target site 106 determines is not associated with a legitimate user known as such to target site 106 (step 302). Target site 106 independently determines that the information received from requestor 110 is that of a synthetic victim (step 304). Additionally or alternatively, target site 106 uses any information received from requestor 110, including its IP address or domain name, to query database 108 for matching synthetic victim information or a known IP address or domain name of a phishing site or other attacker, either directly or by providing the information received from requestor 110 to protector 100 as part of a query (step 306), whereupon the query response indicates that the information is that of a synthetic victim (step 308), optionally providing additional information regarding the synthetic victim and/or phishing site 104 as may be stored in database 108. Target site 106 preferably reports the receipt of synthetic victim information from requestor 110 to protector 100 (step 310), which protector 100 preferably notes in database 108 in association with the matching synthetic victim, preferably together with a timestamp of the attack attempt (step 312). Target site 106 preferably takes one or more predefined security actions as described hereinabove (step 314).

Figure 4:
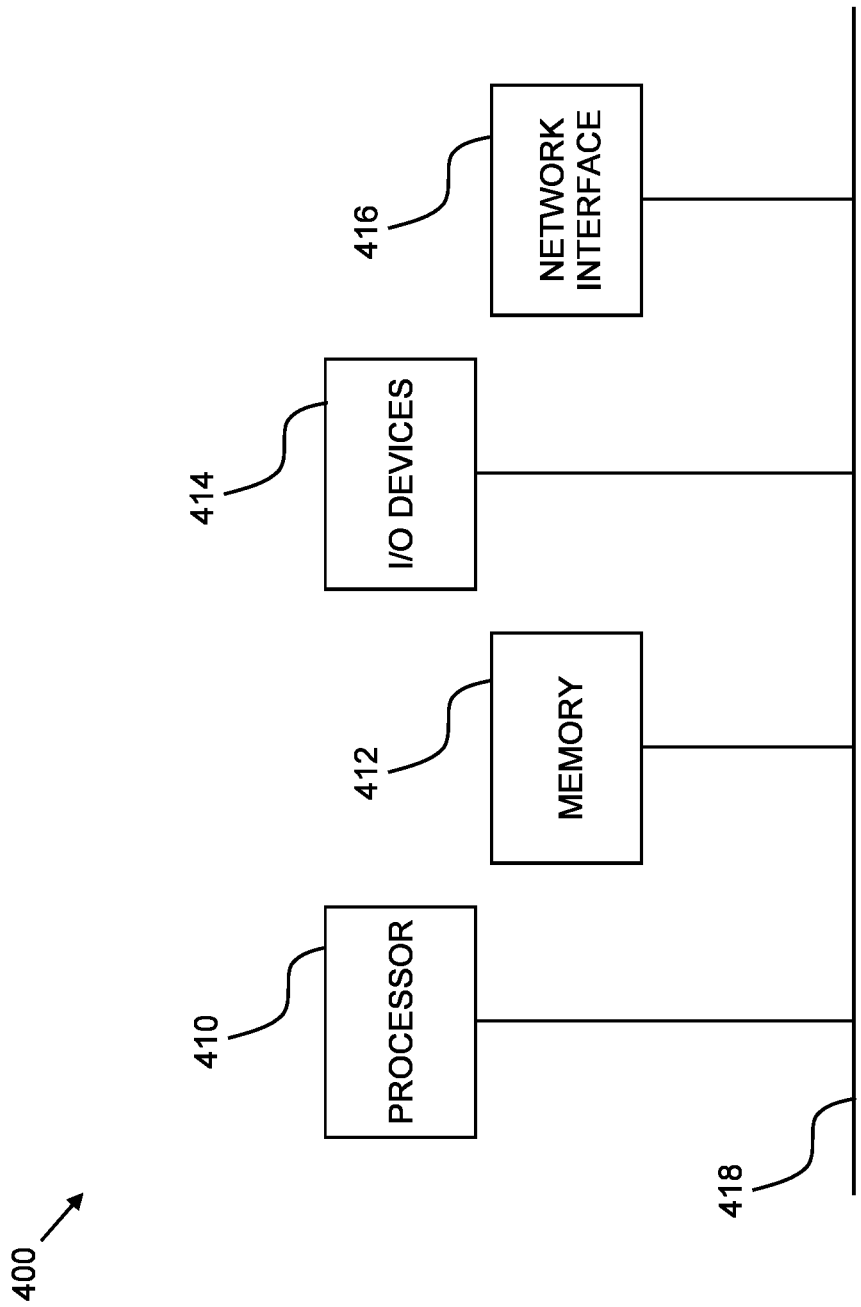
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention. As shown, the invention may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for countering phishing attacks, the method comprising:
   generating a plurality of synthetic victims, wherein each of the synthetic victims includes synthetic victim information that represents a computer user identity and includes associated sensitive information, wherein the computer user identity and its associated sensitive information are fictitious in that they are not known to be associated with a legitimate computer user, wherein the generating includes generating a user name for each of the synthetic victims and using a predefined algorithm to derive an associated password using the user name and a predefined salt;
   providing the predefined algorithm and the salt to a computer-hosted target site, wherein the computer-hosted target site is configured, upon receiving any user name and any password from any requestor, to use the predefined algorithm and the salt to determine that the received password was derived from the received user name, and thereby determine that the received user name and the received password are associated with any of the synthetic victims;
   receiving from the computer-hosted target site, information provided to the computer-hosted target site by a requestor;
   identifying in a computer-accessible database that stores the synthetic victim information, any of the synthetic victim information matching the requestor information; and
   notifying the computer-hosted target site that the requestor information is of a synthetic victim.

2. The method according to claim 1 wherein the generating comprises encoding additional information into the password, wherein the computer-hosted target site is configured to extract the additional information encoded into the password.

3. The method according to claim 2 wherein the encoding comprises encoding a network address of a computer-hosted phishing site into the password.

4. The method according to claim 1 wherein the generating comprises signing the password with an asymmetric private key, wherein the computer-hosted target site is configured to validate the signature using an asymmetric public key paired with the asymmetric private key.

5. The method according to claim 1 and further comprising:
   receiving from the computer-hosted target site a network address of the requestor;
   storing in the computer-accessible database, in association with the synthetic victim information, the network address of the requestor and a timestamp; and
   making any information stored in the computer-accessible database available to parties for security purposes.

6. A system for countering phishing attacks, the system comprising:
   a computer-accessible database; and
   a computer-hosted protector configured to
      generate a plurality of synthetic victims, wherein each of the synthetic victims includes synthetic victim information that represents a computer user identity and includes associated sensitive information, wherein the computer user identity and its associated sensitive information are fictitious in that they are not known to be associated with a legitimate computer user, wherein the computer-hosted protector is configured to generate any of the synthetic victims by generating a user name and using a predefined algorithm to derive an associated password using the user name and a predefined salt,
      provide the predefined algorithm and the salt to a computer-hosted target site, wherein the computer-hosted target site is configured, upon receiving any user name and any password from any requestor, to use the predefined algorithm and the salt to determine that the received password was derived from the received user name, and thereby determine that the received user name and the received password are associated with any of the synthetic victims,
      receive from the computer-hosted target site, information provided to the computer-hosted target site by a requestor,
      identify in a computer-accessible database that stores the synthetic victim information, any of the synthetic victim information matching the requestor information, and
      notify the computer-hosted target site that the requestor information is of a synthetic victim.

7. The system according to claim 6 wherein the computer-hosted protector is configured to encode additional information into the password, wherein the computer-hosted target site is configured to extract the additional information encoded into the password.

8. The system according to claim 7 wherein the computer-hosted protector is configured to encode a network address of a computer-hosted phishing site into the password.

9. The system according to claim 6 wherein the computer-hosted protector is configured to encode sign the password with an asymmetric private key, wherein the computer-hosted target site is configured to validate the signature using an asymmetric public key paired with the asymmetric private key.

10. The system according to claim 6 wherein the computer-hosted protector is configured to:
    receive from the computer-hosted target site a network address of the requestor;
    store in the computer-accessible database, in association with the synthetic victim information, the network address of the requestor and a timestamp; and
    make any information stored in the computer-accessible database available to parties for security purposes.

11. A computer program product for countering phishing attacks, the computer program product comprising:
    a non-transitory, computer-readable storage medium; and
    computer-readable program code embodied in the storage medium, wherein the computer-readable program code is configured to
       generate a plurality of synthetic victims, wherein each of the synthetic victims includes synthetic victim information that represents a computer user identity and includes associated sensitive information, wherein the computer user identity and its associated sensitive information are fictitious in that they are not known to be associated with a legitimate computer user, wherein the computer-readable program code is configured to generate any of the synthetic victims by generating a user name and using a predefined algorithm to derive an associated password using the user name and a predefined salt, provide the predefined algorithm and the salt to the computer-hosted target site, wherein the computer-hosted target site is configured, upon receiving the user name and the password from a requestor, to use the predefined algorithm and the salt to determine that the password was derived from the user name, and thereby determine that the user name and the password are associated with the synthetic victim, receive from the computer-hosted target site, information provided to the computer-hosted target site by a requestor, identify in a computer-accessible database that stores the synthetic victim information, any of the synthetic victim information matching the requestor information, and notify the computer-hosted target site that the requestor information is of a synthetic victim.

12. The computer program product according to claim 11 wherein the computer-readable program code is configured to encode additional information into the password, wherein the computer-hosted target site is configured to extract the additional information encoded into the password.

13. The computer program product according to claim 12 wherein the computer-readable program code is configured to encode a network address of a computer-hosted phishing site into the password.

14. The computer program product according to claim 11 wherein the computer-readable program code is configured to encode sign the password with an asymmetric private key, wherein the computer-hosted target site is configured to validate the signature using an asymmetric public key paired with the asymmetric private key.

15. The computer program product according to claim 11 wherein the computer-readable program code is configured to:

receive from the computer-hosted target site a network address of the requestor;

store in the computer-accessible database, in association with the synthetic victim information, the network address of the requestor and a timestamp; and make any information stored in the computer-accessible database available to parties for security purposes.

* * * * *